Oct. 4, 1932.  H. A. BAKER  1,880,656
BROACH
Filed March 16, 1932
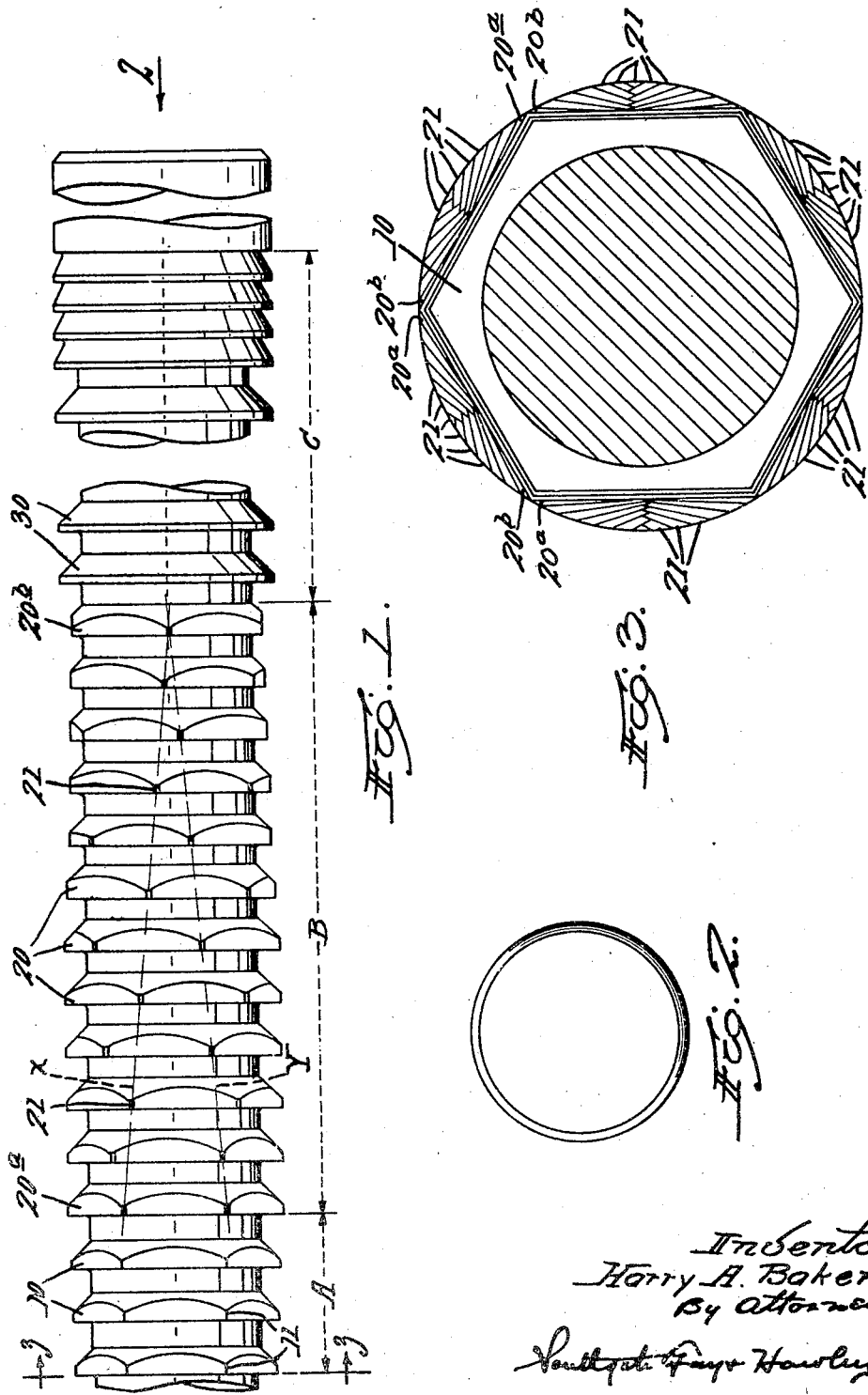
Inventor
Harry A. Baker
By Attorneys Patented Oct. 4, 1932

1,880,656

UNITED STATES PATENT OFFICE

HARRY A. BAKER, OF HUDSON, MASSACHUSETTS, ASSIGNOR TO THE LAPOINTE MACHINE TOOL COMPANY, OF HUDSON, MASSACHUSETTS, A CORPORATION OF MAINE

BROACH

Application filed March 16, 1932. Serial No. 599,206.

This invention relates to tools for broaching holes in cast-iron or other metals. The invention is shown herein as embodied in a broach for finishing cylindrical holes of substantial diameter but is well adapted for broaching other openings having an extended curved periphery. Such work presents an extended surface to the broach and requires excessive power for the broaching operation, as well as subjecting the broach itself to very severe strain.

In a patent to Forberg No. 1,739,220, issued December 10, 1929, a broach is shown in which provision is made for reducing the power consumption and the strain on the broach by providing a series of polyangular cutting sections having narrow cutting portions at the angles of the sections, and with the cutting portions of successive sections displaced angularly in a continuous helical relation.

In the operation of this patented broach upon certain types of work, it has been found that there is a pronounced tendency to twist either the broach or the work, due to the continuous helical arrangement of the cutting portions of the broach.

It is the object of my present invention to improve the construction shown in the prior Forberg patent by positioning the cutting portions in opposed helical series, one right-hand and one left-hand, so that the twisting forces are substantially balanced and the resultant twisting strain is eliminated.

I also provide improvements in the entering or pilot portion of the broach, together with other arrangements and combinations of parts which will be hereinafter described and more particularly pointed out in the appended claims.

A preferred form of the invention is shown in the drawing, in which

Fig. 1 is a plan view of a broach embodying my improvements;

Fig. 2 is an end view thereof, looking in the direction of the arrow 2 in Fig. 1, and Fig. 3 is a sectional elevation, taken along the line 3—3 in Fig. 1.

Referring to the drawing, I have shown my improved broach as comprising a tapered or pilot portion A, a cutting portion B and a finishing portion C.

The tapered or pilot portion A comprises a series of polyangular broaching sections 10 having the cutting portions 11 thereof axially aligned but of increasing diameter.

The portion B of the broach is formed of a series of polyangular cutting sections 20 having cutting portions 21 at the angles of each cutting section. These cutting sections 20 are preferably all of the same diameter, which diameter, taken through the cutting portions, is preferably very slightly below the finished size of the desired cylindrical opening. In the usual practice, the diameter of the sections 20 is about .003" below finished size.

Referring to Fig. 1 and starting from the first or entering cutting section $20^a$, it will be seen that the angular cutting portions 21 are disposed in two separate and opposed helical series, as indicated by the broken lines $x$ and $y$. The cutting portions 21 of the first, third, fifth and all other odd-numbered sections 20 are disposed in a right-hand helical series indicated by the line $x$, while the cutting portions of the first, second, fourth, sixth and all other even-numbered cutting sections are disposed in a left-hand helical series indicated by the line $y$.

It will be noted that the lines $x$ and $y$ preferably cross at the cutting portions of the last cutting section $20^b$, the cutting portions of which are circumferentially positioned exactly half-way between the cutting portions of the section $20^a$.

The finishing portion B of the broach is preferably formed of a series of cutting sections 30 of full finish size, which complete the broaching of the cylindrical opening to the desired diameter.

A broach as thus constructed is found to possess substantial and important advantages. The provision of the tapered entering portion A, with the cutting portions in alignment but gradually increasing in diameter, adapts the broach to variations in the diameter of the rough hole to be broached and allows the broach to be fairly entered in the hole before the portion B with its opposed helical series of cutting portions is engaged.

Thereafter the cutting section 20ª broaches angularly spaced portions of the hole substantially to finished size, and successive sections 20 enlarge these spaced broached portions alternately to the right and left, thus bringing the hole easily to substantially finished size and eliminating any tendency of the broach or work to twist during the broaching operation.

My improved broach thus possesses important advantages over all broaches in the prior art with which I am familiar.

The broach is particularly well adapted for broaching from cored holes in castings of all materials, as the narrow cutting portions 21 of the polyangular sections 20 easily cut under the scale of the casting, the action being similar to that of a narrow planer or shaper tool. A relatively large amount of stock may be removed if necessary. While I have indicated the cutting sections as hexagonal, it will be understood that the number of angles per cutting section may be varied to suit operating conditions.

Furthermore, the periphery of the hole need not be cylindrical nor continuous, as my invention is adapted to any work where extended curved surfaces are to be produced.

Having thus described my invention and the advantages thereof, I do not wish to be limited to the details herein disclosed, otherwise than as set forth in the claims, but what I claim is:—

1. A broach for an opening having an extended curved surface, comprising a plurality of successive cutting sections substantially polyangular in outline and having narrow cutting portions at the angles of said sections and circumferentially spaced apart, the cutting portions of each section being positioned out of axial alignment with the cutting portions of adjacent sections and the cutting portions of alternate sections being positioned in opposed helical series.

2. A broach for an opening having an extended curved surface, comprising a plurality of successive cutting sections substantially polyangular in outline and having narrow cutting portions at the angles of said sections and circumferentially spaced apart, the cutting portions of the first, third and all odd cutting sections being positioned in progressive helical series of one hand and the cutting portions of the first, second, fourth and all even cutting sections being positioned in progressive helical series of the opposite hand.

3. A broach for an opening having an extended curved surface, comprising a plurality of successive cutting sections substantially polyangular in outline and having narrow cutting portions at the angles of said sections and circumferentially spaced apart, the cutting portions of each section being positioned out of axial alignment with the cutting portions of adjacent sections and the cutting portions of alternate sections being positioned in opposed helical series, said broach having also a series of preliminary polyangular cutting sections having cutting portions aligned axially in successive sections and of increasing diameter in successive sections.

4. A broach for an opening having an extended curved surface, comprising a plurality of successive cutting sections substantially polyangular in outline and having narrow cutting portions at the angles of said sections and circumferentially spaced apart, the cutting portions of each section being positioned out of axial alignment with the cutting portions of adjacent sections and the cutting portions of alternate sections being positioned in opposed helical series, said broach having also a series of finishing sections each having the full contour and diameter of the desired opening.

5. A broach for an opening having an extended curved surface, comprising a plurality of successive cutting sections substantially polyangular in outline and having narrow cutting portions at the angles of said sections and circumferentially spaced apart, the cutting portions of each section being positioned out of axial alignment with the cutting portions of adjacent sections and the cutting portions of alternate sections being positioned in opposed helical series, said cutting portions being uniformly of slightly less diameter than the desired finished opening, and said broach having also a series of finishing sections each having the full contour and diameter of the desired opening.

In testimony whereof I have hereunto affixed my signature.

HARRY A. BAKER.